(12) United States Patent
Ladirat

(10) Patent No.: US 8,509,282 B2
(45) Date of Patent: Aug. 13, 2013

(54) MELTING FURNACE WITH AN INDUCTOR DEVICE WITH A SINGLE LOOP CONSISTING OF A PLURALITY OF CONDUCTORS

(75) Inventor: Christian Ladirat, Saint Laurent des Arbres (FR)

(73) Assignees: Commissariat a l'Energie Atomique (FR); Areva NC (FR)

( * ) Notice: Subject to any disclaimer, the term of this patent is extended or adjusted under 35 U.S.C. 154(b) by 1445 days.

(21) Appl. No.: 12/066,159

(22) PCT Filed: Sep. 14, 2006

(86) PCT No.: PCT/EP2006/066380
§ 371 (c)(1),
(2), (4) Date: Mar. 7, 2008

(87) PCT Pub. No.: WO2007/031564
PCT Pub. Date: Mar. 22, 2007

(65) Prior Publication Data
US 2008/0225924 A1 Sep. 18, 2008

(30) Foreign Application Priority Data

Sep. 15, 2005 (FR) ..................................... 05 52783

(51) Int. Cl.
*H05B 6/22* (2006.01)
*H05B 6/02* (2006.01)
*H05B 6/36* (2006.01)

(52) U.S. Cl.
USPC ........... 373/152; 373/138; 373/164; 219/672; 219/674

(58) Field of Classification Search
USPC ............... 373/7, 134, 139, 140, 117, 76, 144, 373/151, 152, 153, 154, 155, 138; 219/420, 219/422, 424, 426, 672, 673, 674, 630
See application file for complete search history.

(56) References Cited

U.S. PATENT DOCUMENTS

| 1,872,990 | A | | 8/1932 | Linnhoff |
| 4,471,488 | A | | 9/1984 | Reboux |
| 5,025,122 | A | * | 6/1991 | Howell ......................... 219/662 |
| 5,987,054 | A | * | 11/1999 | Fishman et al. ............... 373/152 |
| 6,011,246 | A | * | 1/2000 | Bonzano et al. .............. 219/640 |

FOREIGN PATENT DOCUMENTS
FR 641.071 7/1928

* cited by examiner

*Primary Examiner* — Quang Van
*Assistant Examiner* — Hung D Nguyen
(74) *Attorney, Agent, or Firm* — Baker & Hostetler LLP

(57) ABSTRACT

An improved melting furnace including a crucible and a plurality of parallel conductors of identical height surrounding the crucible having at least one descending portion (9) and one ascending portion (10). The benefit from this arrangement is that the conductors all have a portion located at each heating height which guarantees density uniformity of the currents flowing in the conductors even if the load of the crucible has superimposed regions for which the electrical resistivity is different.

4 Claims, 2 Drawing Sheets

PRIOR ART

MELTING FURNACE WITH AN INDUCTOR DEVICE WITH A SINGLE LOOP CONSISTING OF A PLURALITY OF CONDUCTORS

The subject application was filed as a U.S. National Phase Application of PCT international Application PCT/EP2006/066380 filed on Sep. 14, 2006 claiming priority based on the counterpart parent French application 05 52783 filed on Sep. 15, 2005.

DESCRIPTION

The subject of the invention is a melting furnace comprising an inductor device consisting of a plurality of conductors.

In certain melting furnaces used for melting glasses or other refractory materials, a crucible containing the melting bath is surrounded by an inductor device consisting of a single loop which provides the required heat. Such a configuration with a single loop, i.e. extending over a single circumference of the crucible, may appear to be necessary, when voltages of very high frequencies of several hundreds of kilohertz have to be applied, in order to limit the value of these frequencies. However, inductor devices with multiple loops, often consisting of a single conductor are also much more widespread. The inductor device with a single loop comprises a unique continuous annular conductor between two electric terminals close to each other, or alternatively, a plurality of parallel and superimposed conductors over the height of the crucible, and each extending between both terminals, to which they are connected through collectors.

Figure 1:
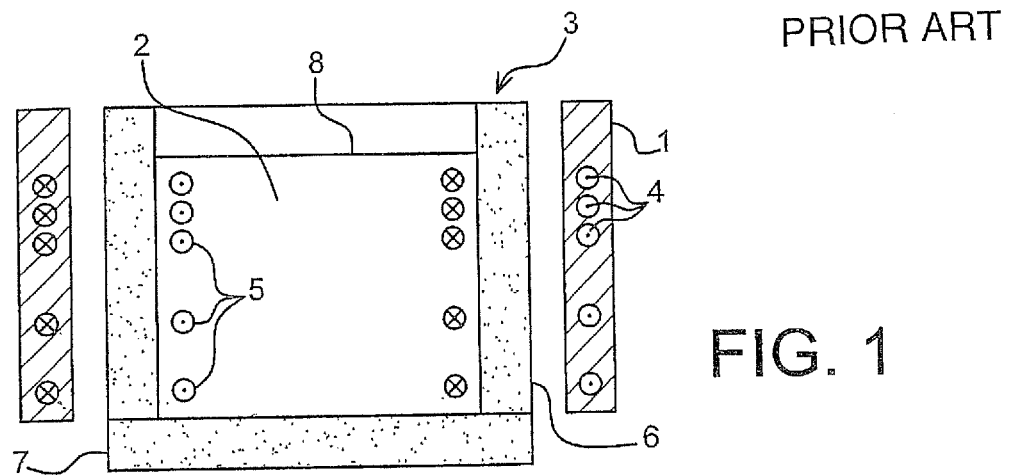

Proper operation of the furnace fails under certain circumstances. Some products to be melted are much more conducting at high temperature than at low temperature. The phenomenon illustrated in FIG. 1 is then observed: a current, whose density is heterogeneous, much larger facing the hot regions of the load 2 thrown into the crucible 3 (the upper region here), flows through the conductor 1, wherein larger antagonistic currents develop. The current lines have reference 4 in the conductor 1 and reference 5 in the load 2. The hottest region of the load 2 is therefore the one which is still subject to more significant heating. Conduction in the load 2 is often incapable of equalizing the temperature therein, which sustains thermal disequilibrium and makes sufficient heating impossible for the coldest region. The situation is the same when the inductor device comprises a plurality of superimposed parallel conductors instead of the single conductor 1 which is illustrated for convenience here, since the current preferentially enters the conductors where it flows more easily when leaving the collector. This difficulty is so serious that the use of inductors with a single loop has been restricted.

The object of the invention is to obviate this difficulty of uniform heating, specific to the inductors with a single loop and especially to a plurality of parallel conductors. It relates to a melting furnace comprising a crucible, an inductor device surrounding the crucible and consisting of a plurality of parallel conductors having the extension of a loop or a circumference, characterized in that the parallel conductors extend as waves with identical length and each comprise at least one descending portion and at least one ascending portion, the ascending portions being positioned in a first layer and the descending portions in a second layer, the layers being concentric around the crucible.

Thus all the conductors each extend at different altitudes and in front of more or less hot and more or less conducting portions of the molten load when it includes any, this uniformizes the facility for the current to pass through them and therefore the density of the current in each of them. This is even more obvious if the conductors all extend between two identical extreme heights delimiting a heating region of the crucible, since their average height is then the same.

U.S. Pat. No. 1,872,990 describes a device with an apparently single conductor and multiple tilted loops for inducing movements and particular secondary currents in the molten bath, and U.S. Pat. No. 4,471,488 describes another device with a single conductor and multiple double-layered loops for increasing the induction power. It is emphasized therein that inductors with a single loop are disadvantageous and that this prior patent therefore does not relate to them.

A simple construction is obtained if the ascending and descending portions are helical and assembled with conductive spacers for spacing out the layers. Finally, in the frequent case when the conductors are grooved with cooling channels also crossing the spacers, the ascending and descending portions are tubes which are blocked at the ends, but provided with side orifices adjacent to the ends.

Figure 2:
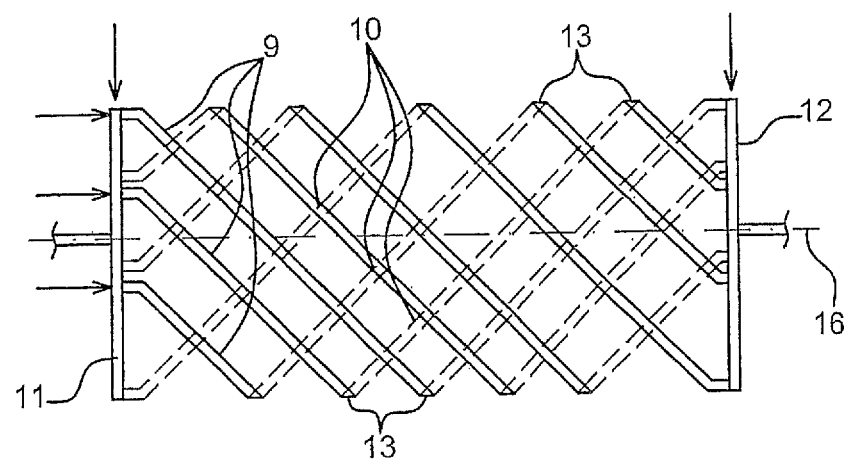
Figure 3:
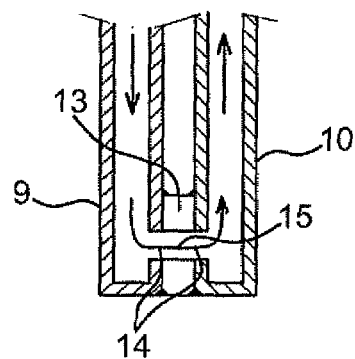
Figure 4:
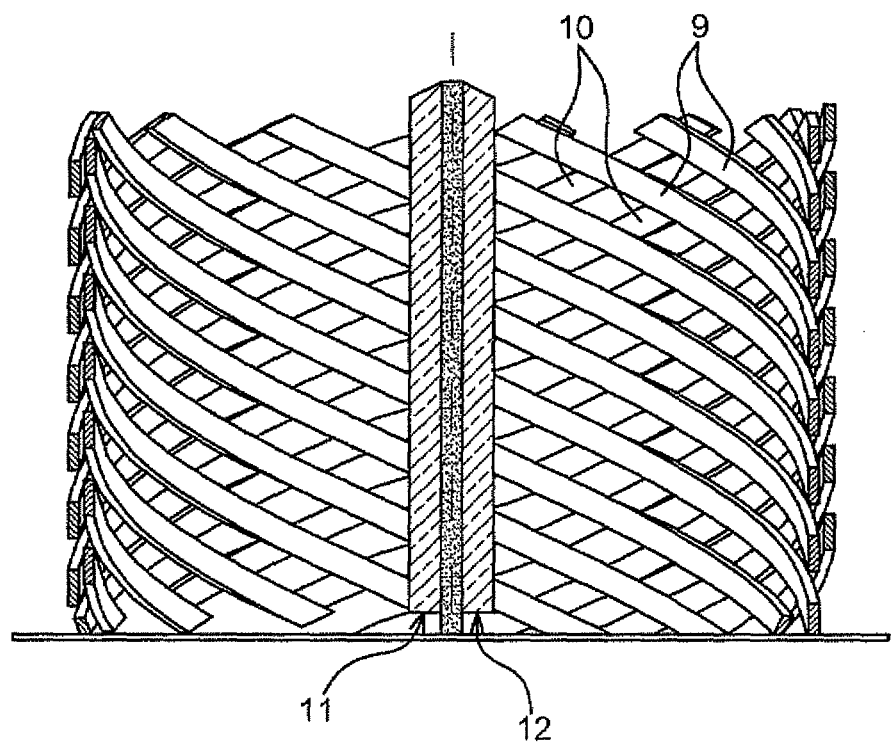

The invention will now be described in detail in connection with the figures:

FIG. 1 illustrates the problem associated with the prior art, and the other figures illustrate the invention, FIG. 2 schematically illustrating the inductor device spread over a plane (only a portion of the conductors is illustrated, the number of conductors being adapted to each case), FIG. 3 illustrating a bend between two portions of the conductors with opposite tilts, and FIG. 4 is an overall view of the inductor device.

FIG. 1 therefore illustrates a crucible 3, which may either be cooled or not, consisting of a cylindrical side wall 6 and of a lower floor 7. The conductor 1 is normally cooled by a circuit of liquid although it is not illustrated, and forms a ring around the side wall 6. The load 2 also comprises ingredients thrown in at different instants, which shows the problem of different temperatures at regions of different heights. It also often happens that preliminary heating of the load 2 is undertaken at the upper surface 8 by forming the hottest region therein. Such induction furnaces are currently used for vitrification of certain nuclear waste materials.

In the invention (FIGS. 2 and 4), each of the conductors has the shape of a wave with identical lengths and successively comprises at least one descending portion 9 and one ascending portion 10 between an inlet collector 11 for water coolant and electricity and an outlet collector 12. The conductors each extend over a circular loop. As the conductors all extend preferably between an upper extreme height and a lower extreme height, and as it is preferred not to extend them for limiting electrical losses excessively, they generally comprise a single ascending portion 10 or a single middle descending portion 9, extending between both extreme heights, and two shorter portions of the other kind each connecting one end of the middle portion to one of the collectors 11 or 12. The connection height for both ends of the conductors is identical on the collectors 11 and 12. The distribution of the set of conductors is such that there is a rotational symmetry axis 16 on the expanded plane shown in FIG. 2; rotation of the network of conductors around this axis 16, horizontally at half height, would lead to a similar network of conductors. The expanded representation shows that the portions 9 and 10 of the conductors are favorably helical so as to remain with a uniform pitch. The connections between descending 9 and ascending 10 portions to the extreme heights form angles. The descending 9 and ascending 10 portions are connected therein by spacers 13 which are also conductive, in copper for example, which are welded to them. The conductors and the collectors 11 and 12 are grooved with cooling channels, and the descending portions 9 and ascending portions 10 are tubular. The tubes are blocked at the ends and communication with the connections is made through side orifices 14 adjacent to the ends which open out in channels 15 passing through the spacers 13 (FIG. 3). A function of the spacers 13 is to establish a separation between two conducting layers, one formed with all the descending portions 9, the other one with all the ascending portions 10, which are concentric around the crucible 2, at different distances from the side wall 6. Short circuits between different conductors are thereby avoided.

The invention claimed is:

1. A melting furnace comprising a crucible and an inductor device surrounding the crucible with the inductor device comprising a plurality of parallel conductors of substantially identical length extending from a common hollow inlet collector to a hollow outlet collector for circulating a cooling liquid with each of the parallel conductors extending over a single loop and single wave and having a middle portion which is either ascending or descending and two shorter portions connecting the middle portion to the inlet collector and outlet collector respectively, wherein said shorter portions are descending when the middle portions connected thereto are ascending and said shorter portions are ascending when the middle portions connected thereto are descending and with all of the ascending portions extending in a first circular layer and all of the descending portions extending in a second circular layer and with the first and second circular layers being concentric around the crucible.

2. The melting furnace according to claim 1, wherein the conductors are arranged so that they have a symmetry axis at a middle height with the symmetry axis extending from the inlet collector to the outlet collector.

3. The melting furnace according to claim 1, wherein all of the conductors are arranged extending between two identical extreme heights.

4. The melting furnace according to claim 3, wherein all of the portions are helical and spread in the first layer and second layer at a uniform pitch with the shorter portions being connected to the middle portions forming angles there between and further comprising tubular spacers opening to form orifices for the cooling liquid.

* * * * *